US011615811B2

United States Patent
Weerasooriya et al.

(10) Patent No.: US 11,615,811 B2
(45) Date of Patent: Mar. 28, 2023

(54) SPLIT ACTUATOR DRIVE THAT LIMITS SLEW RATE OF AGGRESSOR VCM TO REDUCE VICTIM DISTURBANCES

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Siri S. Weerasooriya, Campbell, CA (US); Richard M. Ehrlich, Saratoga, CA (US); Thorsten Schmidt, Livermore, CA (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/459,222

(22) Filed: Aug. 27, 2021

(65) Prior Publication Data
US 2023/0061685 A1    Mar. 2, 2023

(51) Int. Cl.
   *G11B 5/55*          (2006.01)
   *G11B 15/473*        (2006.01)

(52) U.S. Cl.
   CPC .......... *G11B 5/5547* (2013.01); *G11B 15/473* (2013.01)

(58) Field of Classification Search
None
See application file for complete search history.

(56) References Cited

U.S. PATENT DOCUMENTS

| | | | | |
|---|---|---|---|---|
| 4,636,883 A * | 1/1987 | Hashimoto | .......... | G11B 5/5547 360/78.07 |
| 4,931,889 A * | 6/1990 | Osafune | ............... | G11B 5/5547 360/78.07 |
| 5,696,647 A * | 12/1997 | Phan | .................... | G11B 5/5547 360/78.07 |
| 6,011,668 A * | 1/2000 | Choi | .................... | G11B 5/5534 360/78.07 |
| 6,327,229 B1 * | 12/2001 | Kawabe | ............. | G11B 5/59605 369/30.17 |
| 6,594,105 B1 * | 7/2003 | Brittner | ................ | G11B 5/5547 360/78.06 |
| 6,687,081 B1 * | 2/2004 | O'Hara | ................ | G11B 5/5547 360/78.07 |
| 9,940,958 B1 * | 4/2018 | Kiyonaga | .............. | G11B 21/12 |
| 9,947,352 B1 * | 4/2018 | Sudo | .................... | G11B 5/5547 |
| 10,049,691 B1 | 8/2018 | Gaertner et al. | | |
| 10,192,576 B1 | 1/2019 | Gaertner et al. | | |
| 10,347,278 B1 | 7/2019 | Kiyonaga et al. | | |
| 10,504,545 B1 | 12/2019 | Gaertner et al. | | |
| 2021/0096764 A1 | 4/2021 | Calfee et al. | | |

* cited by examiner

*Primary Examiner* — Peter Vincent Agustin
(74) *Attorney, Agent, or Firm* — Kim & Stewart LLP

(57) ABSTRACT

A seek operation of a first actuator in a multi-actuator drive is modified, so that one or more disturbance-generating portions of the seek operation do not adversely affect operation of a second actuator in the drive. Radial motion of the aggressor actuator is controlled by limiting a slew rate of the first actuator during one or more portions of the seek operation to be less than or equal to a threshold value. Because slew rate of the first actuator is the rate of change of radial acceleration of the aggressor actuator with respect to time, limiting the slew rate of the first actuator prevents or reduces mechanical disturbances caused by jerk associated with motion of the first actuator.

14 Claims, 8 Drawing Sheets

SPLIT ACTUATOR DRIVE THAT LIMITS SLEW RATE OF AGGRESSOR VCM TO REDUCE VICTIM DISTURBANCES

BACKGROUND

Magnetic hard disk drives (HDDs) have been employed in information technology as a low-cost means for providing random access to large quantities of data. As the need for data storage has expanded, the areal density of information stored in HDDs has continuously increased. In addition to high storage capacity, the ability of an HDD to access stored data quickly is also important. To meet the ever-increasing requirements for high access performance and faster throughput, HDDs have been configured with multiple rotary actuators and associated read/write channels that are designed to operate simultaneously. Thus, each rotary actuator enables the independent positioning of one or more magnetic heads for reading and writing data, thereby greatly increasing the throughput of such HDDs.

One drawback to the use of independent rotary actuators is that the mechanical interaction between such actuators can affect positioning accuracy of the magnetic heads when both actuators are in use. For example, when one actuator is seeking to a targeted data track, the high accelerations and changes in acceleration of the actuator can generate vibrations which will significantly affect the positioning accuracy of the other actuator while the other actuator is performing sensitive operations, such as writing data, performing delicate calibration procedures, writing precisely positioned servo information, and the like. Consequently, there is a need in the art for reducing the effect of one actuator in a multi-actuator drive on the positioning accuracy of another actuator in the multi-actuator drive.

SUMMARY

One or more embodiments provide systems and methods for preventing motion of a first actuator in a multi-actuator drive (the so-called "aggressor actuator") from adversely affecting motion on a second actuator in the drive (the so-called "victim actuator"). In the embodiments, a seek operation of the aggressor actuator is modified, so that one or more disturbance-generating portions of the seek operation do not adversely affect operation of the victim actuator. Specifically, radial motion of the aggressor actuator is controlled by limiting a slew rate of the aggressor actuator during one or more portions of the seek operation to be less than or equal to a threshold value. Because slew rate of the aggressor actuator is the rate of change of radial acceleration of the aggressor actuator with respect to time, limiting the slew rate of the aggressor actuator prevents or reduces mechanical disturbances caused by jerk associated with motion of the aggressor actuator.

In some embodiments, a multi-actuator drive employs different threshold values for the slew rate of the aggressor actuator depending on a current or scheduled operation of the victim actuator. Alternatively or additionally, in some embodiments, a multi-actuator drive employs different threshold values for the slew rate of the aggressor actuator for different portions of a particular seek operation. In some embodiments, slew rate of the first aggressor is prevented from exceeding a threshold value for the slew rate during a beginning portion and/or an ending portion of a coasting phase of the seek operation. For example, the beginning portion of the coasting phase can act as a smoother transition in the seek operation from an acceleration phase to the coasting phase. In another example, the end portion of the coasting phase can act as a smoother transition in the seek operation from the coasting phase to a deceleration phase.

According to an embodiment, a method of performing a seek operation in a split actuator drive, wherein the split actuator drive includes first and second actuators, wherein the first actuator is coupled to a head and is controlled by a first controller in accordance with a parameter for a target radial velocity for the head, the method comprising: initiating a seek operation with the first actuator; and while the head is accelerating, setting the parameter to a first target radial velocity at a first timing and to a second target radial velocity that is greater than the first target radial velocity at a second timing that is after the first timing.

According to an embodiment, a disk drive includes first and second actuators, wherein the first actuator is coupled to a head; and a controller configured to: initiate a seek operation with the first actuator; control the first actuator in accordance with a parameter for a target radial velocity for the head during the seek operation; and while the head is accelerating, setting the parameter to a first target radial velocity at a first timing and to a second target radial velocity that is greater than the first target radial velocity at a second timing that is after the first timing.

According to an embodiment, a method of performing a seek operation in a split actuator drive that includes a first actuator controlled by a first controller and is coupled to a head, the method comprising: determining a first control signal value for the first actuator when the head passes over a first servo wedge on a recording surface; determining that an absolute value of a difference between the first control signal value and a second control signal value for the first actuator exceeds a first threshold value, wherein a control signal having the second control signal value was asserted by the first actuator when the head passed over a second servo wedge on the recording surface that is circumferentially adjacent to and precedes the first servo wedge; and with the first actuator, asserting a control signal having a third control signal value instead of the first control signal value, wherein the third control signal value is based on a combination of the second control signal value and the first threshold value.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
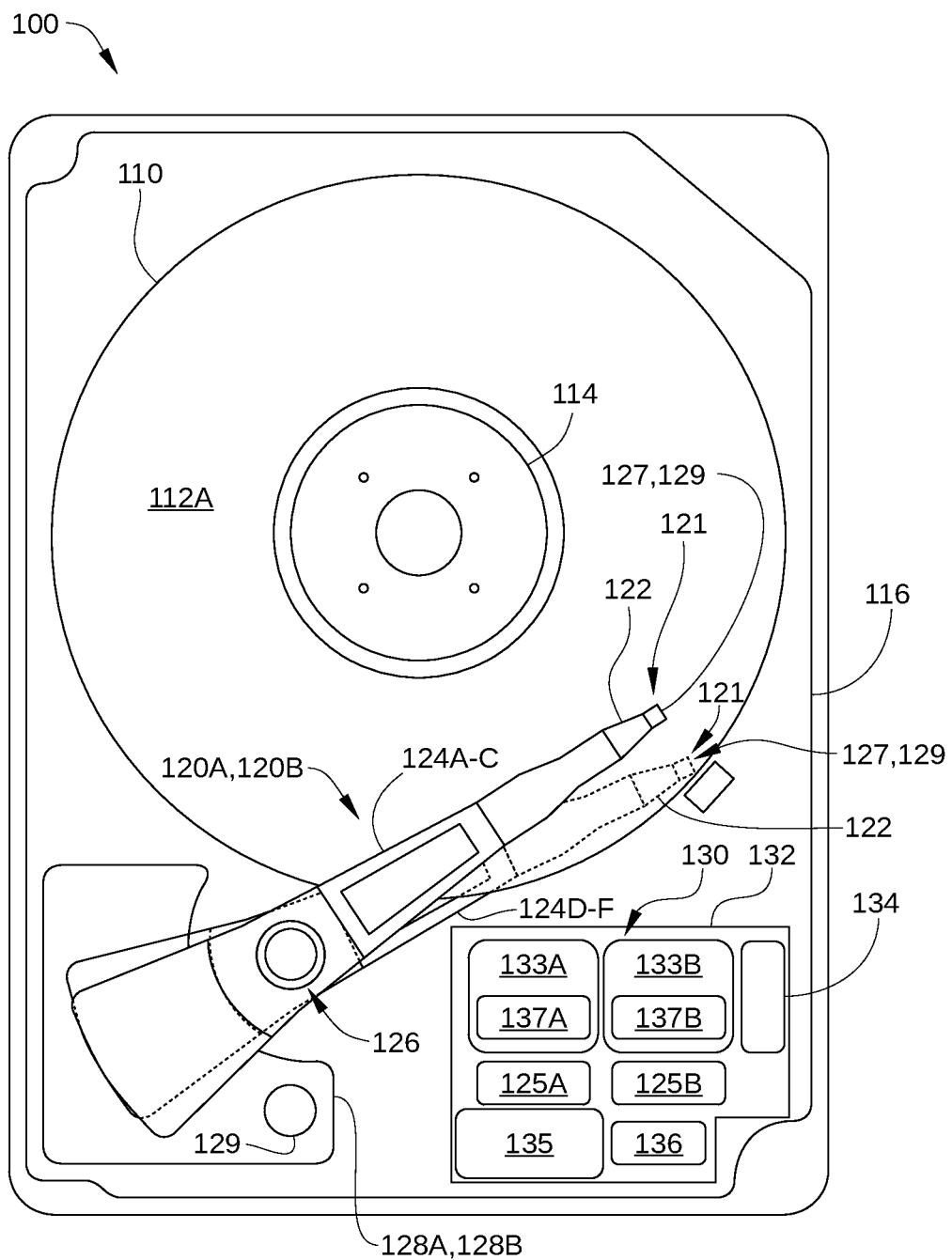
FIG. 1 is a schematic view of an exemplary hard disk drive (HDD), according to an embodiment.

FIG. 1 is a schematic view of an exemplary hard disk drive (HDD) 100, according to one embodiment. For clarity, HDD 100 is illustrated without a top cover. HDD 100 is a multiple actuator drive (in particular a split-actuator drive), and includes storage disks 110, each including one or two recording surfaces on which a plurality of concentric data storage tracks are disposed. In FIG. 1, only the top recording surface 112A of storage disk 110 is visible. The storage disks 110 are coupled to and rotated by a spindle motor 114 that is mounted on a base plate 116. Two actuator arm assemblies 120A and 120B are also mounted on base plate 116, and each of the assemblies includes arm-mounted sliders 121 with magnetic read/write heads 127 that read data from and write data to the data storage tracks of an associated recording surface, such as recording surface 112A.

In the embodiments illustrated herein, actuator arms 124A-124C are included in actuator arm assembly 120A, and actuator arms 124D-124F are included in actuator arm assembly 120B. Actuator arm assembly 120A and the actuator arms 124A-124C included therein are rotated together about a bearing assembly 126 by a voice coil motor (VCM) 128A independently from actuator arm assembly 120B. Likewise, actuator arm assembly 120B and the actuator arms 124D-124F included therein are rotated together about bearing assembly 126 by a VCM 128B independently from actuator arm assembly 120A. Thus, each of VCMs 128A and 128B moves a group of the sliders 121 and read/write heads 127 radially relative to a respective recording surface of a storage disk 110 included in HDD 100, thereby providing radial positioning of a corresponding read/write head 127 over a desired concentric data on a recording surface, for example on recording surface 112A. Spindle motor 114, the read/write heads 127, and VCMs 128A and 128B are coupled to electronic circuits 130, which are mounted on a printed circuit board 132.

Electronic circuits 130 include a system-on-chip (SoC) 133A, an SoC 133B, a random-access memory (RAM) 134 (which may be a dynamic RAM and is used as one or more data buffers), motor-driver chips 125A and 125B, and/or a flash memory device 135. In some embodiments, electronic circuits 130 include a flash manager device 136 associated with flash memory device 135. In some embodiments, SoC 133A is a microprocessor-based controller implemented as a single chip that includes read channel 137A and other electronic devices associated with VCM 128A. Similarly, SoC 133B is a microprocessor-based controller implemented as a single chip that includes read channel 137B and other electronic devices associated with VCM 128B. Motor-driver chip 125A accepts commands from SoC 133A and drives VCM 128A and spindle motor 114, and motor-driver chip 125B accepts commands from SoC 133B and drives VCM 128B. In the embodiment illustrated in FIG. 1, HDD 100 is shown with multiple motor-driver chips 125A and 125B that drive spindle motor 114 and VCMs 128A and 128B. In other embodiments, HDD 100 includes a single motor-driver chip that drives spindle motor 114 and VCMs 128A and 128B. Further, in other embodiments, any other partition of the jobs of spindle motor control, actuator control, and microactuator control can be implemented. Via a preamplifier (not shown), read/write channel 137A communicates with read/write heads 127 of actuator arm assembly 120A and read/write channel 137B communicates with read/write heads 127 of actuator arm assembly 120B. The preamplifiers are mounted on a flex-cable, which is mounted on either base plate 116, one of actuators 120A or 120B, or both.

When data are transferred to or from a particular recording surface of HDD 100, one of the actuator arm assemblies 120A or 120B moves in an arc between the inner diameter (ID) and the outer diameter (OD) of the storage disk 110. The actuator arm assembly accelerates in one angular direction when current is passed in one direction through the voice coil of the corresponding VCM and accelerates in an opposite direction when the current is reversed, thereby allowing coarse control of the radial position of the actuator arm assembly and the attached read/write head with respect to the particular storage disk 110.

In some embodiments, fine radial positioning of each read/write head 127 is accomplished with a respective microactuator 129. The microactuator 129 for each read/write head 127 is mechanically coupled to the actuator arm 124 that corresponds to the read/write head 127. Each microactuator 129 typically includes one or more piezoelectric elements and is configured to move a corresponding read/write head 127 radially a small distance, for example on the order of a few tens or hundreds of nanometers. When employed together, microactuators 129 and voice coil motors 128A and 128B are sometimes referred to as dual-stage actuators, where voice coil motor 128A or 128B is the prime mover and each microactuator 129 is a second-stage actuator. Dual-stage actuators enable the servo system of HDD 100 to attain more accurate tracking control.

In some embodiments, each microactuator 129 is mounted on a respective flexure arm 122, at a gimbal between the respective flexure arm 122 and the corresponding slider 121. In such embodiments, each microactuator 129 rotates the corresponding slider 121, causing radial motion (relative to corresponding recording surface) of the corresponding read/write head 127. Alternatively or additionally, in some embodiments, each microactuator 129 is mounted on an end of an actuator arm 124 or on the flexure arm, itself, and moves the flexure arm 122 through a relatively large arc, for example on the order of a hundred track widths. In yet other embodiments, each microactuator 129 includes a first piezoelectric or other movable element at the gimbal between the respective flexure arm 122 and the corresponding slider 121 and a second piezoelectric or other movable element at the end of the actuator arm 124 or on the flexure arm. In such embodiments, each read/write head 127 is provided with three-stage actuation in the radial direction.

In the embodiment illustrated in FIG. 1, only one slider 121, one flexure arm 122, and one read/write head 127 are shown for actuator arm assembly 120A, and only one slider 121, one flexure arm 122, and one read/write head 127 are shown for actuator arm assembly 120B. In other embodiments, each of actuator arm assemblies 120A and 120B can include a plurality of sliders, flexure arms, and read/write heads. Further, in some embodiments, HDD 100 can include more than two actuator arm assemblies, each rotated about bearing assembly 126 by a respective VCM independently from each other. In other embodiments, additional actuators may rotate about other bearing assemblies.

Figure 2:
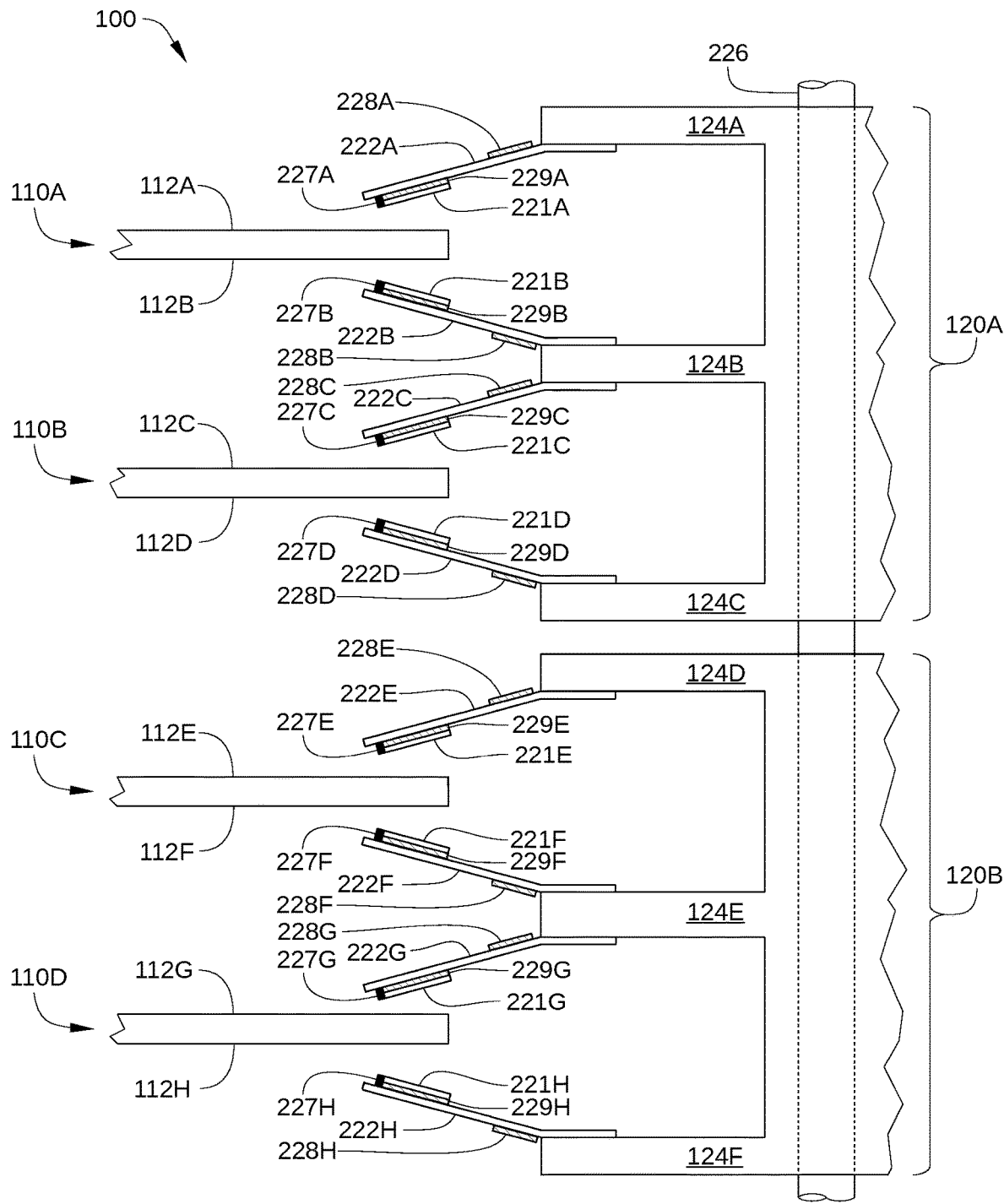
FIG. 2 schematically illustrates a partial side-view of multiple storage disks and two independent actuator arm assemblies of the HDD of FIG. 1.

FIG. 2 schematically illustrates a partial side-view of multiple storage disks 110A-110D and two independent actuator arm assemblies 120A and 120B of HDD 100, according to an embodiment. The recording surfaces of multiple storage disks 110A and 110B are each accessed by one of the read/write heads included in the independent actuator arm assembly 120A (e.g., read/write heads 227A, 227B, 227C, and 227D), and the recording surfaces of multiple storage disks 110C and 110D are each accessed by the read/write heads included in the independent actuator arm assembly 120B (e.g., read/write heads 227E, 227F, 227G, and 227H). Thus, in the embodiment illustrated in FIG. 2, HDD 100 is configured with multiple storage disks 110A-110D having a total of eight recording surfaces 112A-112H and multiple read/write heads 227A-227H, each corresponding to one of these recording surfaces. Specifically, in the embodiment illustrated in FIG. 2, HDD 100 includes: a storage disk 110A with recording surfaces 112A and 112B; a storage disk 110B with recording surfaces 112C and 112D; a storage disk 110C with recording surfaces 112E and 112F; and a storage disk 110D with recording surfaces 112G and 112H. Thus, read/write head 227A reads data from and writes data to recording surface 112A, read/write head 227B reads data from and writes data to corresponding recording surface 112B, and so on.

Read/write heads 227A-227H are disposed on sliders 221A-221H, respectively, and sliders 221A-221H (referred to collectively herein as sliders 221) are respectively coupled to actuator arms 124A-124F via gimbals near the end of each of the flexure arms 222A-222H (referred to collectively herein as flexure arms 222) as shown. In some embodiments, each of sliders 221A-221H is mounted on a corresponding one of flexure arms 222 via a gimbal-mounted microactuator (GMA) 229A-229H (referred to collectively herein as microactuators 229), such as a second-stage micro-actuator (MA) that includes two lead zirconate titanate piezoelectric actuators attached to the gimbal of the corresponding flexure arm 222. Alternatively, in some embodiments, each of sliders 221A-221H is mounted directly on a corresponding a gimbal on one of flexure arms 222. In some embodiments, micro-actuators 228A-228H are attached near the base of each of the flexure arms 222A-222H (sometimes referred to as milli-actuators). Some embodiments may include both types of microactuators.

In the embodiment illustrated in FIG. 2, flexure arm 222A is coupled to an actuator arm 124A, flexure arms 222B and 222C are coupled to an actuator arm 124B, flexure arm 222D is coupled to an actuator arm 124C, flexure arm 222E is coupled to an actuator arm 124D, flexure arms 222F and 222G are coupled to an actuator arm 124E, and flexure arm 222H is coupled to an actuator arm 124F. Actuator arms 124A-124F are referred to collectively herein as actuator arms 124. In the embodiment illustrated in FIG. 2, each of microactuators 228A-228H (referred to collectively herein as microactuators 228) is disposed at a base of flexure arms 222A-222H, respectively, i.e., at an end of one of actuator arms 124. Alternatively or additionally, in some embodiments, microactuators 229A-229H can be disposed proximate sliders 221A-221H, respectively, i.e., at a tip of flexure arms 222A-222H, respectively. In embodiments in which microactuators 229 are disposed proximate sliders 221, each of microactuators 229 can include a gimbal microactuator. In either case, each of microactuators 229 and/or 228 compensates for perturbations in the radial position of sliders 221, so that read/write heads 227A-227H follow the proper data track on recording surfaces 112. Thus, microactuators 229 can compensate for vibrations of the disk, inertial events such as impacts to HDD 100, and irregularities in recording surfaces 112 or in the written servo-pattern.

Actuator arms 124A-124C are included in actuator arm assembly 120A, and actuator arms 124D-124F are included in actuator arm assembly 120B. In an embodiment of the invention, actuator arm assemblies 120A and 120B are independently controlled and both rotate about bearing assembly 126 (which includes a same shaft axis 226).

In positioning one of read/write heads 227A-227H over a corresponding recording surface (i.e., one of recording surfaces 112A-112H), the servo system determines an appropriate current to drive through the voice coil of the appropriate voice coil motor (i.e., either VCM 128A or 128B), and drives said current using a current driver and associated circuitry, e.g., included in motor-driver chip 125A or 125B. Typically, the appropriate current is determined based in part on a position feedback signal of the read/write head 127, i.e., a position error signal (PES). The PES is typically generated by using servo patterns included in the servo wedges on the recording surface as a reference. One embodiment of such a recording surface 112 is illustrated in FIG. 3.

Figure 3:
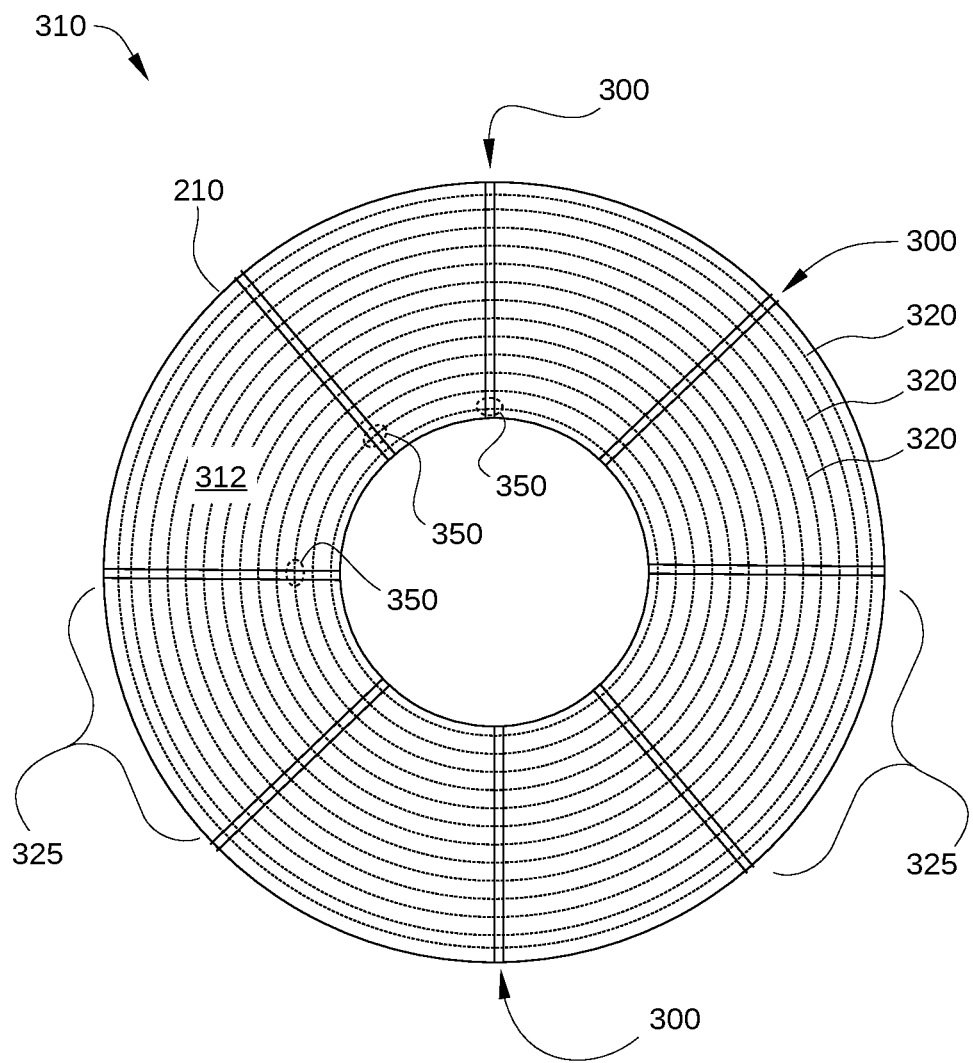
FIG. 3 illustrates a recording surface of a storage disk with servo wedges and concentric data storage tracks formed thereon, according to an embodiment.

FIG. 3 illustrates a recording surface 312 of a storage disk 310 with servo wedges 300 and concentric data storage tracks 320 formed thereon, according to an embodiment. Recording surface 312 can be any of recording surfaces 112A-112H in FIG. 2. Servo wedges 300 may be written on recording surface 312 by either a media writer, or by HDD 100 itself via a self-servo-write (SSW) process. Servo wedges 300 are typically radially aligned. In practice, servo wedges 300 may be somewhat curved. For example, servo wedges 300 may be configured in a spiral pattern that mirrors the path that would be followed by a corresponding read/write head 127 (shown in FIG. 1) if the read/write head 127 were to be moved across the stroke of one of actuator arm assemblies 120A or 120B while storage disk 310 is not spinning. Such a curved pattern advantageously results in the wedge-to-wedge timing being independent of the radial position of the read/write head 127. For simplicity, servo wedges 300 are depicted as substantially straight lines in FIG. 3. Each servo wedge 300 includes a plurality of servo sectors 350 containing servo information that defines the radial position and track pitch, i.e., spacing, of data storage tracks 320.

Data storage tracks 320 for storing data are located in data sectors 325, and are positionally defined by the servo information written in servo sectors 350. The region between two servo sectors may contain more than, equal to, or less than one data sector, including the possibility of fractional data-sectors. Each servo sector 350 encodes a reference signal that is read by the read/write head 127 as the read/write head 127 passes over the servo sector. Thus, during read and write operations, the read/write head 127 can be positioned above a desired data storage track 320. Typically, the actual number of data storage tracks 320 and servo wedges 300 included on recording surface 312 is considerably larger than that illustrated in FIG. 3. For example, recording surface 312 may include hundreds of thousands of concentric data storage tracks 320 and hundreds of servo wedges 300.

Figure 4:
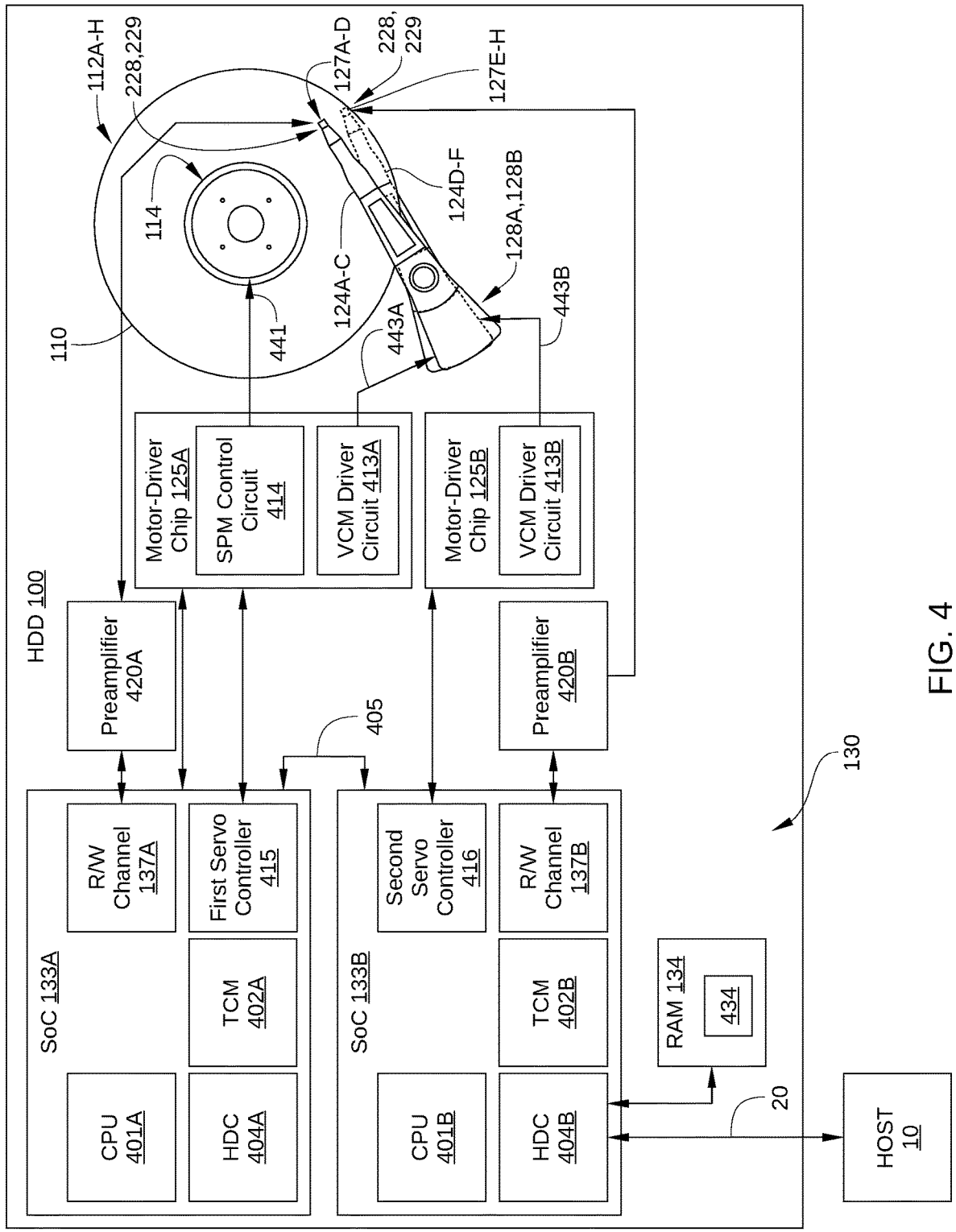
FIG. 4 illustrates an operational diagram of the HDD of FIG. 1, with some elements of electronic circuits and a motor-driver chip shown configured according to one embodiment.

FIG. 4 illustrates an operational diagram of HDD 100 configured to implement various embodiments. In the embodiment illustrated in FIG. 4, a specific configuration of certain elements of electronic circuits 130 is described. In other embodiments, any other suitable arrangement or configuration of electronic circuits 130 may be employed that is operable to implement one or more embodiments described herein. For example, in the embodiment illustrated in FIG. 4, HDD 100 is configured with a first microprocessor-based controller (SoC 133A) that is associated with VCM 128A and a second microprocessor-based controller (SoC 133B) that is associated with VCM 128B. In other embodiments, various elements of SoC 133A and/or SoC 133B may be configured in a single SoC and/or implemented as stand-alone chips included in electronic circuits 130.

HDD 100 is connected to a host 10, such as a host computer, via a host interface 20, such as a serial advanced technology attachment (SATA) bus or a Serial Attached Small Computer System Interface (SAS) bus or a Non-Volatile Memory Express (NVMe) bus. As shown, electronic circuits 130 of HDD 100 include SoC 133A, SoC 133B, RAM 134, motor driver chip 125A communicatively coupled to SoC 133A, and motor driver chip 125B communicatively coupled to SoC 133B.

In the embodiment illustrated in FIG. 4, SoC 133A includes one or more central processing units (CPUs) 401A or other processors, a tightly-coupled memory (TCM) 402A, a first servo controller 415, a hard disk controller (HDC) 404A, and read/write channel 137A, and SoC 133B includes one or more central processing units (CPUs) 401B or other processors, a TCM 402B, a second servo controller 416, an HDC 404B, and read/write channel 137B. TCM 402A is disposed proximate CPU 401A, so that CPU 401A suffers either a small number of or zero wait states when fetching data therefrom. Similarly, TCM 402B is disposed proximate CPU 401B. In some embodiments, TCM 402A and TCM 402B each include static random-access memory (SRAM), ferroelectric RAM (FRAM), and/or other suitable high-speed memory.

In some embodiments, communications between SoC 133A and SoC 133B are enabled at least in part with a bus 405 that communicatively couples SoC 133A and SoC 133B. In such embodiments, bus 405 enables CPU 401A to read from and write to at least some commonly accessible memory locations associated with SoC 133B and CPU 401B to read from and write to at least some commonly accessible memory locations associated with SoC 133A. Such memory locations may include one or more of a shared memory region 434 included in RAM 134, specific registers or other memory locations in TCM 402A, specific registers or other memory locations in TCM 402B, and/or other specifically designated memory locations (not shown) within SoC 133A and SoC 133B.

Motor-driver chip 125A includes VCM driver circuit 413A, MA driver circuits (not shown), and a spindle motor (SPM) control circuit 414, and motor-driver chip 125B includes VCM driver circuit 413B and MA driver circuits (not shown). Alternatively, in some embodiments, HDD 100 includes a single motor driver chip. In such embodiments, the single motor driver chip is configured for controlling spindle motor 114, VCM 128A, and VCM 128B.

VCM driver circuit 413A of motor-driver chip 125A generates an amplified control signal 443A (such as a current) in response to control signals (referred to herein as VCM commands) from first servo controller 415. VCM driver circuit 413B of motor-driver chip 125B generates an amplified control signal 443B (such as a current) in response to control signals (VCM commands) from second servo controller 416. Control signals 443A enable execution of disk access commands received from host 10 that are to be executed by a first servo system of HDD 100 that includes VCM 128A. Control signals 443B enable execution of disk access commands received from host 10 that are to be executed by a second servo system of HDD 100 that includes VCM 128B. Thus, HDD 100 includes two (or more) independent servo-control systems, each controlling the tracking of a VCM and associated MA and read/write heads 127.

Generally, RAM 134 is shared by SoC 133A and SoC 133B, and therefore can be accessed by CPU 401A or 401B. In the embodiment illustrated in FIG. 4, RAM 134 is directly coupled to one SoC of HDD 100 (e.g., SoC 133B), while other SoCs of HDD 100 (e.g., SoC 133A) access RAM 134 via bus 405. In some embodiments, CPU 401A communicates with CPU 401B and vice-versa via one or more "mailbox" memory locations in RAM 134. In such embodiments, RAM 134 includes a shared memory region 434 that is accessed by CPU 401A and CPU 401B. In the embodiment illustrated in FIG. 4, HDD 100 includes a single RAM 134 that is external to SoC 133A and SoC 133B. In other embodiments, HDD 100 may include any other suitable configuration of RAM 134, such as a DRAM device integrated in SoC 133A and another DRAM device integrated in SoC 133B, or a commonly accessible DRAM device that is included in a separate package mounted on circuit board 132. In other embodiments, CPU 401A and CPU 401B communicate with each other by accessing a suitable memory, such as a memory in SoC 133A that is accessible by CPU 401B and/or a memory in SoC 133B that is accessible by CPU 401A.

HDD 100 further includes a preamplifier 420A associated with read/write heads 127A-127D and a preamplifier 420A associated with read/write heads 127E-127H. Preamplifiers 420A and 420B can be each mounted on actuator arm assemblies 120A and 120B or elsewhere within the head and disk assembly (HDA) of HDD 100. Preamplifier 420A supplies a write signal (e.g., current) to read/write head 127A in response to write data input from read/write channel 137A. Similarly, preamplifier 420B supplies a write signal (e.g., current) to read/write head 127B in response to write data input from read/write channel 137B. In addition, preamplifier 420A amplifies a read signal output from to read/write head 127A and transmits the amplified read signal to read/write channel 137A, and preamplifier 420B amplifies a read signal output from to read/write head 127B and transmits the amplified read signal to read/write channel 137B.

CPU 401A and CPU 401B control HDD 100, for example according to firmware stored in flash memory device 135 or another nonvolatile memory, such as portions of recording surfaces 112A-112H. For example, CPU 401A manages various processes performed by HDC 404A, read/write channel 137A, read/write heads 127A-127D, recording surfaces 112A-112D, and/or motor-driver chip 125A, while CPU 401B manages various processes performed by HDC 404B, read/write channel 137B, read/write heads 127E-127H, recording surfaces 112E-112H, and/or motor-driver chip 125B. Such processes include a writing process for writing data onto recording surfaces 112A-112H, a reading process for reading data from recording surfaces 112A-112H, various calibration processes, a self-servo-writing process, and the like. Generally, such processes include one or more seek operations, in which a particular read/write head 127 is moved to a target radial position over a corresponding recording surface 112.

In some embodiments, a first servo system of HDD 100 (e.g., CPU 401A, read/write channel 137A, preamplifier 420A, first servo controller 415, voice-coil motor 128A, and a suitable microactuator 228 or 229) performs positioning of a read/write head 127 included in actuator arm assembly 120A (e.g., read/write head 127A) over a corresponding recording surface (e.g., recording surface 112A), during which CPU 401A determines an appropriate current to drive through the voice coil of VCM 128A. Typically, the appropriate current is determined based in part on a position feedback signal of the read/write head, i.e., a position error signal (PES). Similarly, the second servo system of HDD 100 (e.g., CPU 401B, read/write channel 137B, preamplifier 420B, second servo controller 416, voice-coil motor 128B, and a suitable microactuator 228 or 229) performs positioning of a read/write head 127 included in actuator arm assembly 120B (e.g., read/write head 127D) over a corresponding recording surface (e.g., recording surface 112D), during which CPU 401B determines an appropriate current to drive through the voice coil of VCM 128B. Although one CPU for each actuator of HDD 100 is shown herein, in alternative embodiments, a single CPU may be employed to perform the operations of CPU 401A and CPU 401B. In other alternative embodiments, each SoC may contain multiple CPUs, one or more of them controlling servo operations, while one more others control read-write operations and/or communications with the host 10.

Read/write channels 137A and 137B are signal processing circuits that encode write data input from HDC 404A and HDC 404B and output the encoded write data to respective preamplifiers 420A and 420B. Read/write channels 137A and 137B also decode read signals transmitted from respective preamplifiers 420A and 420B into read data that are respectively outputted to HDC 404A and HDC 404B. In some embodiments, read/write channels 137A and 137B each include a single read channel and a single write channel, whereas in other embodiments, read/write channels 137A and 137B each include multiple write channels and/or multiple read channels for read/write heads 127A-127H. In some embodiments, HDC 404A controls access to RAM 134 by CPU 401A and read/write channels 137A, and receives/transmits data from/to host 10. In some embodiments, such communications between HDC 404A, RAM 134, read/write channel 137A, and/or host 10 are enabled via SoC 133B and bus 405. In some embodiments, HDC 404B controls access to RAM 134 by CPU 401B, and read/write channel 137B. In some embodiments, such communications between HDC 404B, RAM 134, and/or read/write channel 137B are enabled via SoC 133B. HDC 404B receives/transmits data from/to host 10 via interface 20.

In the embodiment illustrated in FIG. 4, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

As noted previously, when one actuator of a multi-actuator HDD (the so-called "aggressor actuator") performs a seek operation, cross-actuator coupling can generate vibrations which significantly affect the positioning accuracy of the other actuator (the so-called "victim actuator"). Thus, when the victim actuator is performing a position-sensitive operation while the aggressor actuator is performing a disturbance-generating operation, the positioning accuracy of the victim actuator is likely to be degraded and the position-sensitive operation can be deleteriously affected. Examples of position-sensitive operations include performing a long sequential write, writing clock information, and writing servo information, such as servo bursts and/or a servo spiral. Examples of position-sensitive operations may further include certain calibration operations, such as a control loop bandwidth calibration, a repeatable runout calibration, and the like.

According to various embodiments described herein, the effects of a seek operation performed by an aggressor actuator of a multi-actuator drive on the tracking of one or more victim actuators in the drive are reduced. In the embodiments, a seek operation of the aggressor actuator is modified, so that one or more disturbance-generating portions of the seek operation do not adversely affect operation of the one or more victim actuators. Specifically, radial motion of the aggressor actuator is controlled by limiting a slew rate of the aggressor actuator during one or more portions of the seek operation to be less than or equal to a threshold value. Such embodiments are described below in conjunction with FIGS. 5 and 6.

Figure 5:
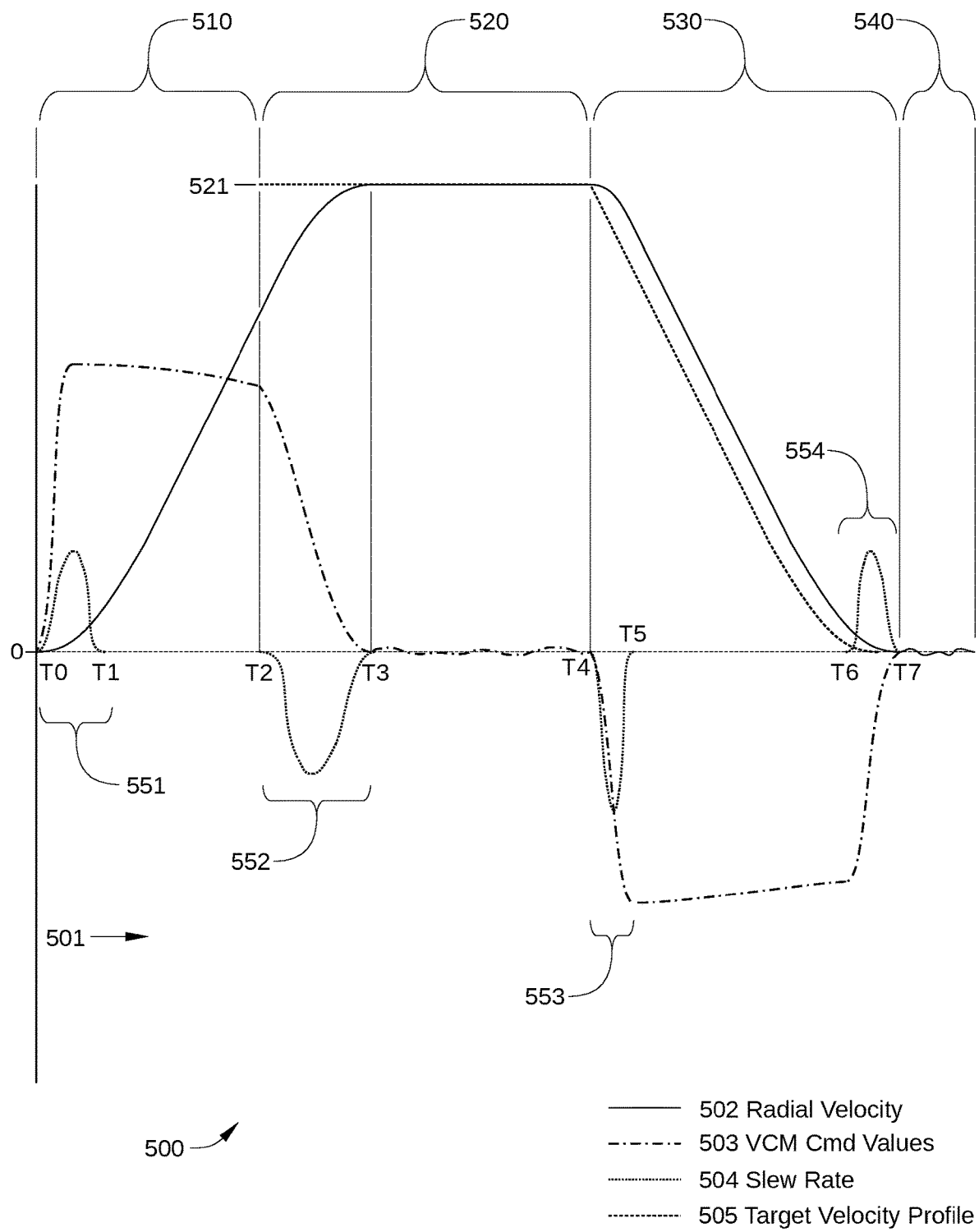
FIG. 5 is a schematic illustration of various attributes of the radial motion of an actuator during a conventional seek operation.

FIG. 5 is a schematic illustration of various attributes of the radial motion of an actuator during a conventional seek operation 500, according to various embodiments. Conventional seek operation 500 is performed by an aggressor actuator included in HDD 100 (e.g., VCM 128A) and includes radially repositioning a read/write head (e.g., one of read/write heads 127A-127D) that is coupled to the aggressor actuator from an initial radial position to a target radial position with respect to a corresponding recording surface (e.g., recording surface 112A). In FIG. 5, the initial radial position, the target radial position, the read/write head, and the corresponding recording surface are not shown. Instead, attributes of the radial motion of the aggressor actuator during conventional seek operation 500 are shown varying over time, which is indicated by a plurality of position samples 501. Such attributes include a radial velocity 502 of the read/write head, a VCM command value 503 (which may correspond to amplified control signal 443A or 443B in FIG. 4), a slew rate 504 (which is the rate of change of VCM command value 503 at a particular position sample 501), and a target velocity profile 505. For clarity, the above attributes are each depicted in FIG. 5 with respect to an appropriate normalized scale. For example, radial velocity 502 and target velocity profile 505 may indicate tracks traveled by the read/write head per position sample 501; VCM command value 503 may indicate a current applied to the VCM of the aggressor actuator at each position sample 501 (or alternatively a value of the rate of change of radial velocity 502 at each position sample 501); and slew rate 504, also referred to as "jerk," may indicate the rate of change of the current applied to the VCM of the aggressor actuator at each position sample 501. Target velocity profile 505 indicates a target radial velocity of the read/write head in certain phases of conventional seek operation 500 (e.g., a coasting phase 520 and/or a deceleration phase 530, which are described below).

Each position sample 501 represents a different point in time, and in some instances corresponds to a different servo wedge that is passed over by the read/write head coupled to the aggressor actuator. As a result, the number of position samples 501 included in conventional seek operation 500 varies as a function of seek length, which is the radial distance (for example in tracks) between the initial radial position and the target radial position of seek operation 500. Conventional seek operation 500 can include hundreds or thousands of position samples 501.

Conventional seek operation 500 is divided into multiple phases, including an acceleration phase 510, coasting phase 520, and deceleration phase 530, and is followed by a settling and track-following phase 540. Upon completing a transition into settling and track-following phase 540, the read/write head is positioned at or near the target radial position and conventional seek operation 500 ends.

In acceleration phase 510, the aggressor actuator accelerates radially from an initial velocity (e.g., approximately 0) to a coasting velocity 521 that is included in the portion of target velocity profile 505 associated with coasting phase 520. Thus, during acceleration phase 510, radial velocity 502 of the read/write head increases over time as a function of VCM command values 503. To achieve coasting velocity 521 as quickly as practicable, the read/write head is accelerated continuously throughout acceleration phase 510. In the instance illustrated in FIG. 5, radial velocity 502 increases at a roughly constant rate, as indicated by the roughly constant slope of radial velocity 502 and the roughly constant values for VCM command values 503 from time T1 to time T2 in acceleration phase 510. However, prior to increasing at the roughly constant rate, slew rate 504 first undergoes a sharp increase from time T0 to time T1 in acceleration phase 510, as the rate of radial acceleration of the read/write head changes from 0 to the roughly constant rate of acceleration that occurs between time T1 and T2. That is, the second derivative of the values of radial velocity 502 (also indicated in FIG. 5 as slew rate 504) between time T0 and time T1 is generally significantly greater than 0, indicating that a significant mechanical disturbance can result from the radial motion of the aggressor actuator between time T0 and time T1. Once the roughly constant rate of radial acceleration of the read/write head begins at time T1, values of slew value 504 subside to approximately 0.

In the instance illustrated in FIG. 5, conventional seek operation 500 is associated with a radial distance of sufficient length to include coasting phase 520. In other instances, conventional seek operation 500 can be associated with a radial distance that is too short to include a coasting phase 520. Furthermore, in the instance illustrated in FIG. 5, the rate of radial acceleration of the read/write head between time T1 and T2 remains roughly constant. In other instances and/or in other embodiments of HDD 100, the rate of radial acceleration of the read/write head between time T1 and T2 may vary over time, but generally does not include rapid changes that cause slew rate 504 to spike.

At time T2, coasting phase 520 begins, and at time T4, coasting phase 520 ends. In coasting phase 520, the read/write head is controlled to move radially at a roughly constant radial velocity, i.e., at coasting velocity 521. In some instances, time T2 corresponds to a position sample 501 at which a current value for radial velocity 502 is within a predetermined radial velocity offset from coasting velocity 521. The servo system associated with the aggressor actuator then moves the read/write head radially by controlling radial velocity 502 to coasting velocity 521. Alternatively, time T2 corresponds to a position sample 501 at which a current radial position of read/write head 127 is within a predetermined radial position offset from a track associated with the beginning of coasting phase 520. In either case, the rate at which radial velocity 502 accelerates begins decreasing, often very sharply. As a result, there is a sharp increase in the rate of change from time T2 to time T3 in coasting phase 520, as the rate of radial acceleration of the read/write head changes from the roughly constant rate of radial acceleration that occurs between time T1 and T2 to approximately 0 radial acceleration between time T3 and T4. That is, the second derivative of the values of radial velocity 502 (indicated in FIG. 5 as slew rate 504) between time T2 and time T3 is generally significantly less than 0, indicating a significant mechanical disturbance can result from the radial motion of the aggressor actuator between time T2 and time T3. Once the roughly constant rate of radial acceleration of the read/write head begins at time T3, large values of slew rate 504 subside to approximately 0.

At time T4, deceleration phase 530 begins, and at time T7 deceleration phase 530 ends. In deceleration phase 530, the aggressor actuator decelerates radially from coasting velocity 521, being controlled based on values for radial velocity included in target velocity profile 505. As shown, at time T4, target velocity profile 505 changes from coasting velocity 521 to a decreasing velocity profile, in which values for target velocity profile 505 decrease over time, for example at a constant or substantially constant rate. Thus, in deceleration phase 530, radial velocity 502 is changed from coasting velocity 521 to approximately 0 as quickly as practicable.

To implement deceleration phase 530, VCM command values 503 are generated so that radial velocity 502 of the read/write head decreases over time and follows the values of target velocity profile 505. Thus, in the instance illustrated in FIG. 5, radial velocity 502 decreases at a roughly constant rate, as indicated by the roughly constant slope of radial velocity 502 and the relatively flat slope of VCM command values 503 between time T5 and time T6 in deceleration phase 530. However, after decreasing at the roughly constant rate between time T5 and time T6, radial velocity 502 then undergoes a sharp increase in rate of change from time T6 to time T7 in deceleration phase 530, as the rate of radial deceleration of the read/write head suddenly changes to approximately 0 when the read/write head nears the target radial position and transitions to settling and track-following phase 540. That is, the second derivative of the values of radial velocity 502 (indicated in FIG. 5 as slew rate 504) between time T6 and time T7 is generally significantly greater than 0, indicating that a significant mechanical disturbance can result from the radial motion of the aggressor actuator between time T6 and time T7. Once the transition to settling and track-following phase 540 is complete at time T7 and track-following begins, values of slew rate 504 subside to approximately 0.

In light of the above, conventional seek operation 500 may include up to four disturbance events 551, 552, 553, and/or 554, where positive or negative values of slew rate 504 spike. According to various embodiments, radial motion of an aggressor actuator is controlled so that values for slew rate 504 in some or all of disturbance events 551-554 are limited, thereby preventing or ameliorating mechanical disturbances associated with disturbance events 551-554. Such embodiments are described below in conjunction with FIG. 6.

Figure 6:
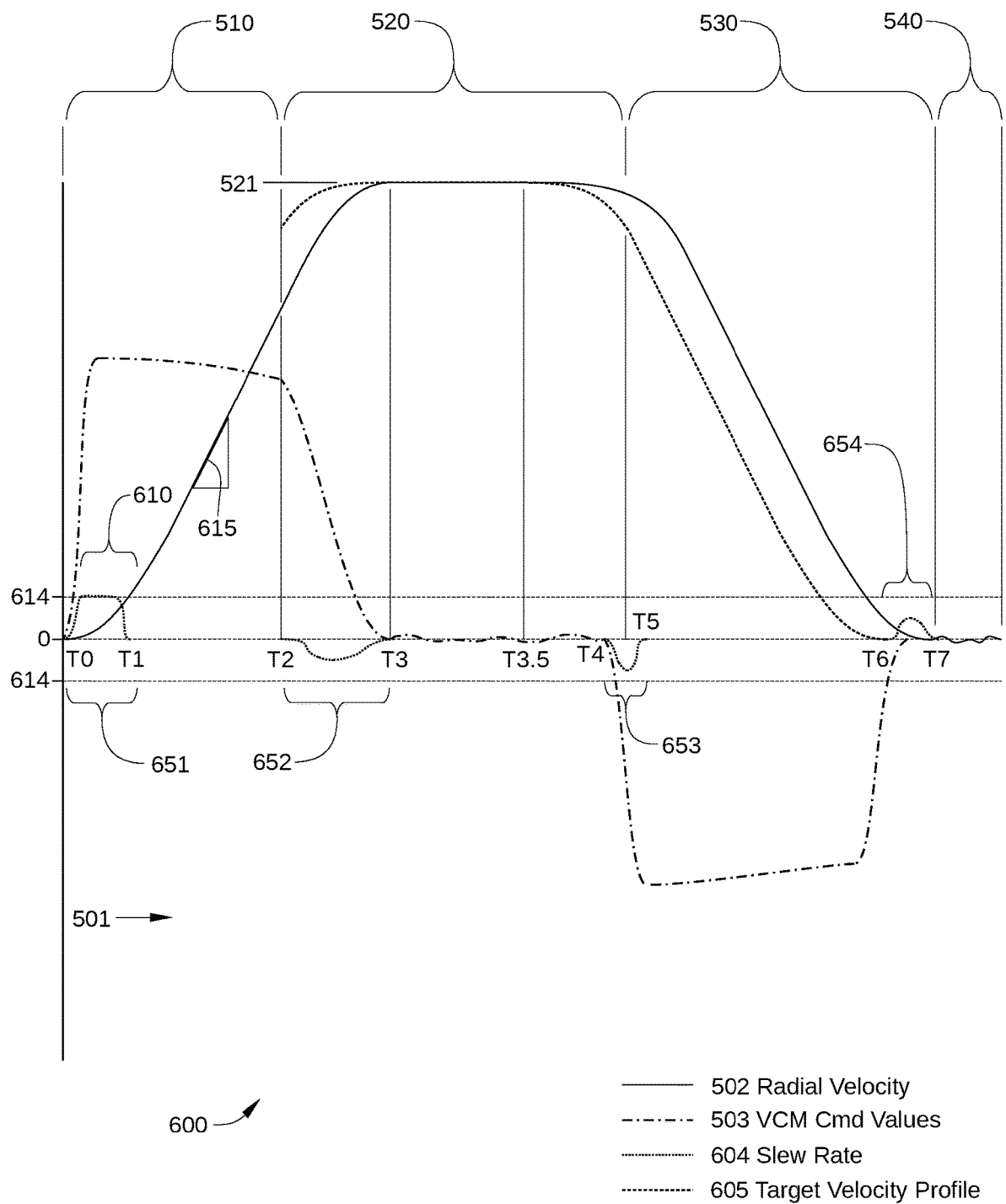
FIG. 6 is a schematic illustration of various attributes of the radial motion of an aggressor actuator during a seek operation, according to various embodiments.

FIG. 6 is a schematic illustration of various attributes of the radial motion of an aggressor actuator during a seek operation 600, according to various embodiments. Seek operation 600 is substantially similar to conventional seek operation 500 of FIG. 5, with certain exceptions. Specifically, in seek operation 600, radial motion of an aggressor actuator is controlled so that values for a slew rate 604 in some or all of disturbance events 651-654 of seek operation 600 are significantly reduced relative to the corresponding values for slew rate 504 in conventional seek operation 500 of approximately the same seek length.

In some embodiments, values for slew rate 604 in some or all of disturbance events 651-654 of seek operation 600 are limited to a maximum threshold value or slew rate limit, e.g., slew rate threshold value 614. For example, in one such embodiment, for each servo wedge that is passed over by the read/write head during acceleration phase 510, a VCM command value 503 is selected so that a difference between the current VCM command value 503 and the preceding VCM command value 503 is equal to or less than slew rate threshold value 614. As a result, slew rate threshold value 614 is not exceeded throughout acceleration phase 510. In the embodiment, for each servo wedge k passed over during acceleration phase 510, a value $u_k$ for VCM command value 503 at servo wedge k is determined based on any suitable radial acceleration calculation for accelerating the read/write head to coasting velocity 521 (such as velocity feedback control). If an absolute value of a difference between $u_k$ and $u_{k-1}$ (the VCM command value 503 asserted by the aggressor actuator at servo wedge k-1) is less than slew rate threshold value 614, then $u_k$ is accepted as the VCM command value 503 associated with servo wedge k, and $u_k$ is asserted by the aggressor actuator accordingly. However, if an absolute value of the difference between $u_k$ and $u_{k-1}$ is greater than or equal to slew rate threshold value 614, then $u_k$ is not accepted as the VCM command value 503 associated with servo wedge k. Instead, the VCM command value 503 that is accepted for servo wedge k is a combination of $u_k$ and slew rate threshold value 614, so that the VCM command value 503 that is accepted for servo wedge k does not vary from $u_{k-1}$ by more than slew rate threshold value 614. In some embodiments, the VCM command value 503 that is accepted for servo wedge k is: $u_{k-1}+\mathrm{sgn}(u_{k-1}-u_k)$*slewRate. Thus, if the difference between $u_k$ and $u_{k-1}$ is greater than or equal to slew rate threshold value 614, then the VCM command value 503 that is accepted for servo wedge k is the sum of $u_{k-1}$ and slew rate threshold value 614, while if the difference between $u_k$ and $u_{k-1}$ is a negative value, then the VCM command value 503 that is accepted for servo wedge k is the value of $u_{k-1}$ minus slew rate threshold value 614. Consequently, in the embodiment, the aggressor actuator asserts a different VCM command value 503 at servo wedge k than a calculated (or otherwise determined) VCM command value 503 for servo wedge k when slew rate threshold value 614 is exceeded in either the positive direction or the negative direction.

In practice, in an acceleration ramping portion 610 of acceleration phase 510, which occurs between time T0 and time T1, the aggressor actuator typically increases the radial acceleration of the read/write head quickly (e.g., from approximately 0) to a roughly constant rate of acceleration (indicated by slope 615 of radial velocity 502). According to the above-described embodiment, the rate at which VCM command value 503 changes between time T0 and T1 is limited to slew rate threshold value 614. By contrast, between time T1 and T2, the rate at which VCM command value 503 changes from one servo wedge to the next is relatively modest, and is not replaced with slew rate threshold value 614.

In some embodiments, a single value of slew rate threshold 614 is employed for some or all of disturbance events 651-654 of seek operation 600. In other embodiments, a different value of slew rate threshold 614 is employed for different disturbance events 651-654 of seek operation 600. Additionally or alternatively, in some embodiments, a different value of slew rate threshold 614 is employed during seek operation 600 based on a current or planned operation for a victim actuator of HDD 100. For example, in some instances, the current or planned operation of the victim actuator includes a position-sensitive operation that can be adversely affected by mechanical disturbances caused by one or more of disturbance events 651-654 of seek operation 600. In such instances, a lower value of slew rate threshold 614 is employed during seek operation 600 to reduce or eliminate such mechanical disturbances. Further, in such embodiments, a value of slew rate threshold 614 that is employed during seek operation 600 may vary depending on the specific position-sensitive operation that is planned for and/or currently being performed by the victim actuator.

During seek operation 600, transitions from one seek state to another can result in a sharp increase of slew rate 504, such as the transition from acceleration phase 510 to coasting phase 520 and the transition from coasting phase 520 to deceleration phase 530. Generally, in coasting phase 520 and deceleration phase 530, radial motion of the read/write head is controlled at each servo wedge based on the current radial velocity 502 measured at the servo wedge and on a target radial velocity associated with the servo wedge. Thus, coasting phase 520 and deceleration phase 530 are velocity-control portions of seek operation 600. According to some embodiments, during transitions from a first seek state to a second seek state, modified velocity control calculations are employed for determining VCM command values 503. As a result, VCM command values 503 are selected that prevent values for slew rate 604 from exceeding slew rate threshold 614. Such modified velocity control calculations are now described.

In some embodiments, radial motion of a read/write head is controlled at each servo wedge during coasting phase 520 and deceleration phase 530 based on Equations 1-8, described below. Equation 1 describes the plant dynamics associated with acceleration of the aggressor actuator at a particular servo wedge k, where: $u_k$=a value to be asserted by the aggressor actuator after the read/write head passes over servo wedge k (for example, a VCM command value 503 for servo wedge k); m=a mass of the system radially accelerated by the aggressor actuator; $a_k$=an intended acceleration of the system to be performed by the aggressor actuator after the read/write head passes over servo wedge k; and $v_k$=a determined velocity at the kth servo wedge.

$$u_k = ma_k = m(v_k - v_{k-1}) \qquad (1)$$

Equation 2 describes the change in acceleration between a first servo wedge k-1 and a second adjacent servo wedge k. In Equation 2, $u_k - u_{k-1}$ corresponds to the value of slew rate 604 at servo wedge k when a VCM command value 503 ($u_k$) is asserted by the aggressor actuator.

$$u_k - u_{k-1} = m(v_k - v_{k-1}) - m(v_{k-1} - v_{k-2}) \qquad (2)$$

Equations 3-7 are velocity control equations that describe slew rate 604 at servo wedge k with respect to $u_k$, $u_{k-1}$, $v_k$, $v_{ref,k}$, and $K_v$, where $v8_{ref,k}$=a target velocity for the kth servo wedge (for example, a target velocity profile 605), and $K_v$=a velocity control gain. Specifically, Equation 3 describes the VCM command value 503 for servo wedge k, Equation 4 describes the VCM command value 503 for servo wedge k-1, and Equation 5 describes the value for slew rate 604 for servo wedge k.

$$u_k = K_v(v_{ref,k} - v_k) \qquad (3)$$

$$u_{k-1} = K_v(v_{ref,k-1} - v_{k-1}) \qquad (4)$$

$$u_k - u_{k-1} = \quad (5)$$

$$K_v(v_{ref,k} - v_k) - K_v(v_{ref,k-1} - v_{k-1}) = K_v(v_{ref,k} - v_{ref,k-1}) - K_v(v_k - v_{k-1})$$

Equation 6 describes the value for slew rate 604 for servo wedge k after substitution, and Equation 7 describes a slew rate threshold value 614 ($|u_k - u_{k-1}|$) with respect to $v_k$, $v_{ref,k}$, and $\alpha$, where $\alpha = K_v(1 + K_v/m)^{-1}$.

$$u_k - u_{k-1} = \frac{K_v(v_{ref,k} - v_{ref,k-1}) - K_v(v_{k-1} - v_{k-2})}{\left(1 + \frac{K_v}{m}\right)} \quad (6)$$

$$|u_k - u_{k-1}| \leq \alpha |K_v(v_{ref,k} - v_{ref,k-1})| + \alpha |K_v(v_{k-1} - v_{k-2})| \quad (7)$$

It is noted that, based on Equation 7, there is a sequence of $v_{ref,k}$ and a choice of $K_v$ that will ensure that $|u_k - u_{k-1}|$ does not exceed slew rate threshold value 614 when velocity feedback control defined by Equation 3 is being performed. Thus, in some embodiments, particular values for $v_{ref,k}$ and $K_v$ are selected based on the value of slew rate threshold value 614 that is being applied to the current seek operation. In such embodiments, the particular values for $v_{ref,k}$ and $K_v$ are selected so that Equations 3 and 4 are satisfied and VCM control is prevented from becoming unstable. For example, for a lower value of slew rate threshold value 614, lower values of $v_{ref,k}$ and $K_v$ are generally selected.

According to various embodiments, slew rate 604 is prevented from exceeding slew rate threshold value 614 at a particular servo wedge k by determining $v_{ref,k}$ based on $v_{ref,k-1}$. As a result, $v_{ref,k}$ changes over time at a beginning portion of coasting phase 520 and/or at an end portion of coasting phase 520. By contrast, in a conventional seek operation, such as seek operation 500 if FIG. 5, the target velocity $v_{ref,k}$ throughout coasting phase 520 is a constant value (e.g., coasting velocity 521). One such embodiment is described below in conjunction with FIG. 7.

Figure 7:
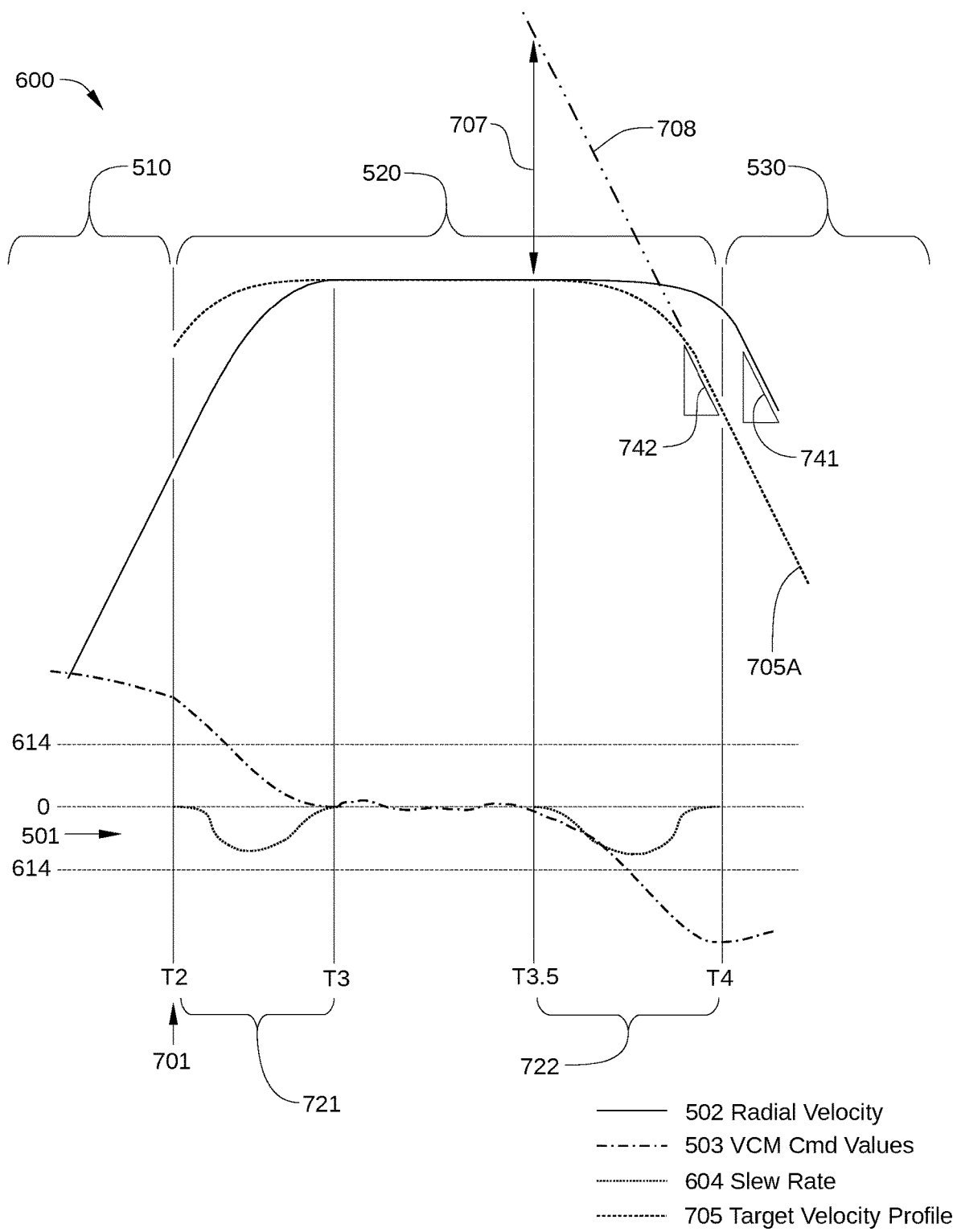
FIG. 7 is a more detailed schematic illustration of various attributes of the radial motion of an aggressor actuator during a coasting phase of the seek operation of FIG. 6, according to various embodiments.

FIG. 7 is a more detailed schematic illustration of various attributes of the radial motion of an aggressor actuator during coasting phase 520 of seek operation 600, according to various embodiments. As shown, coasting phase 520 includes a beginning portion 721 and/or an end portion 722.

In beginning portion 721, a target velocity profile 705 varies with time, and therefore includes different values than coasting velocity 521 of coasting phase 520. For example, in the embodiment illustrated in FIG. 7, coasting phase 520 begins at time T2, which corresponds to a time at which the read/write head passes over a position sample 701. Consequently, radial motion of an aggressor actuator is determined at time T2 based on $v_{k-1}$, $v_{k-2}$, $v_{ref,k}$, and $v_{ref,k-1}$, and Equation 7. Specifically, the VCM command value 503 for the servo wedge associated with position sample 701 corresponds to $u_k$ in Equation 7. Further, to ensure that slew rate 604 ($u_k - u_{k-1}$ in Equation 7) at position sample 701 does not exceed a slew rate threshold value (e.g., slew rate threshold value 614), the value for $v_{ref,k}$ in Equation 7 is determined based on $v_{ref,k-1}$. In some embodiments, the value for $v8_{ref,k}$ is determined based on Equation 8:

$$v_{ref,k} = v_{ref,k-1} + n_k \text{SlewRamp} \quad (8)$$

In some embodiments, in Equation 8, SlewRamp is an empirical factor that varies depending on the current slew rate threshold value 614. In some embodiments, $n_k$ is an integer that varies from N at time T2 to 0 at time T3 (when radial velocity 502 of the read/write head is approximately equal to coasting velocity 521). In such embodiments, N is an integer that varies for a particular instance of seek operation 600 depending on the current slew rate threshold value 614 (shown in FIG. 6) and/or on the seek length (for example number of tracks) of the particular instance of seek operation 600. Thus, based on Equation 8, for each progressive position sample after position sample 701, a difference between $v_{ref,k}$ and $v_{ref,k-1}$ in Equation 7 decreases in magnitude until radial velocity 502 of the read/write head is approximately equal to coasting velocity 521. In this way, the second derivative of radial velocity 502 in beginning portion 721 is not discontinuous and the current slew rate threshold value 614 is not exceeded.

In some embodiments, the value of N in Equation 8 is an empirical factor that varies depending on the seek length of seek operation 600. In such embodiments, N decreases in value for longer seek lengths and increases in value for shorter seek lengths. In such embodiments, values of N may be stored in HDD 100, for example in a look-up table that is accessible by first servo controller 415 and second servo controller 416. In such embodiments, the look-up table can be stored in any suitable memory device, including RAM 134 or some other memory device included in SoC 133A, SoC 133B, first servo controller 415, and/or second servo controller 416. Further, in some embodiments, the value of N for a particular seek length may also vary depending on the current slew rate threshold value 614. In such embodiments, N decreases in value for larger values of slew rate threshold 614 and increases in value for smaller values of slew rate threshold 614.

In end portion 722, target velocity profile 705 varies with time, and therefore includes different values than coasting velocity 521 of coasting phase 520. In the embodiment illustrated in FIG. 7, end portion 722 begins at a time T3.5 and ends at time T4. At time T3.5, control of radial velocity 502 of the read/write head begins to transition from coasting velocity 521 to following the target velocities included in a deceleration profile portion 705A. In some embodiments, time T3.5 corresponds to a time (or position sample 501) at which a radial velocity difference 707 between radial velocity 502 and a deceleration reference trajectory 708 occurs, where deceleration reference trajectory 708 is an extension of and has the same slope as deceleration profile portion 705A. Thus, at time T3.5, $v_{ref,k}$ begins to be changed from coasting velocity 521 in anticipation of intersecting with deceleration reference trajectory 708. Time T4 corresponds to a time at which the read/write head follows deceleration profile portion 705A of target velocity profile 705. Thus, at time T4, a rate of change (i.e., a slope 741) of radial velocity 502 in end portion 722 is approximately equal to but no greater than a rate of change (i.e., a slope 742) of target radial velocities in deceleration profile portion 705A of target velocity profile 705.

Similar to beginning portion 721, in end portion 722, radial motion of the aggressor actuator is determined based on $v_{k-1}$, $v_{k-2}$, $v_{ref,k}$, and $v_{ref,k-1}$, and Equation 7. Further, in some embodiments, in end portion 722, the value for $v_{ref,k}$ in Equation 7 is different for each time sample included in end portion 722. For example, in some embodiments, the value for $v_{ref,k}$ in Equation 7 is determined based on $v_{ref,k-1}$, via Equation 8, However, unlike beginning portion 721, in end portion 722, $n_k$ is an integer that varies from 0 at time T3.5 to N at time T4. Thus, based on Equation 8, for each position sample after time T3.5, a difference between $v_{ref,k}$ and $v_{ref,k-1}$ in Equation 7 becomes progressively larger until slope 741 of radial velocity 502 in end portion 722 is approximately equal to but no greater than slope 742 of deceleration profile portion 705A of target velocity profile 705.

In the instance illustrated in FIGS. 6 and 7, seek operation 600 is associated with a radial distance of sufficient length to include coasting phase 620. In other instances, seek operation 600 can be associated with a radial distance that is too short to include a coasting phase 620. However, seek operation 600 typically includes coasting phase 620, to facilitate a transition from acceleration phase 510 to deceleration phase 530 without exceeding slew rate threshold 614.

Figure 8:
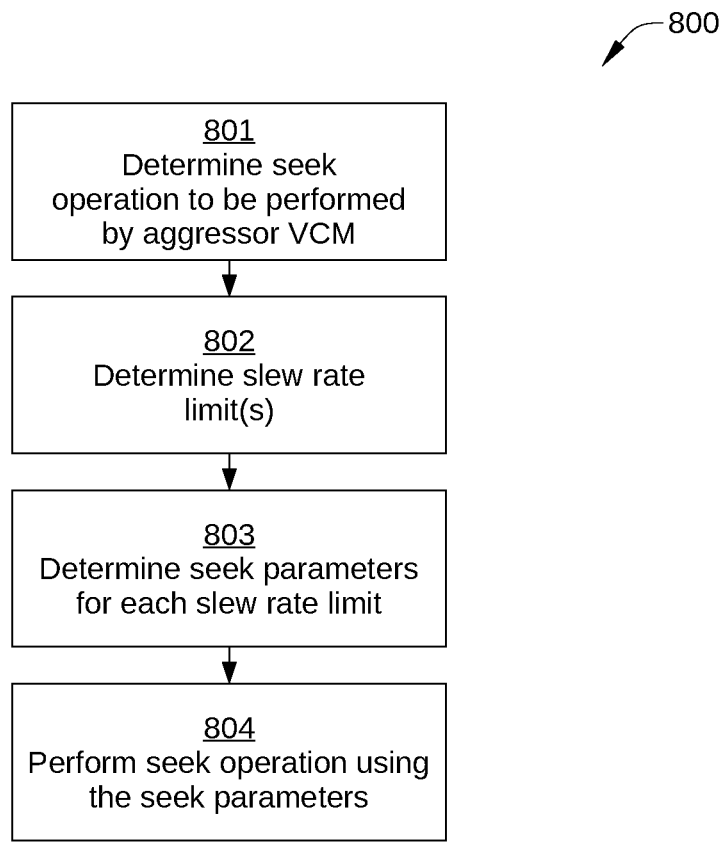
FIG. 8 sets forth a flowchart of method steps for performing a seek operation in a split actuator drive, according to an embodiment.

FIG. 8 sets forth a flowchart of method steps for performing a seek operation in a split actuator drive, such as HDD 100, according to an embodiment. Although the method steps are described in conjunction with HDD 100 of FIGS. 1-7, persons skilled in the art will understand that the method steps may be performed with other types of systems. The control algorithms for the method steps may reside in first servo controller 415 and second servo controller 416. Alternatively, in some embodiments, a portion of the control algorithms for the method steps may reside in CPU 401A and CPU 401B. Further, the control algorithms can be implemented in whole or in part as software- or firmware-implemented logic, and/or as hardware-implemented logic circuits.

A method 800 begins at step 801, when a control algorithm (for example, included in first servo controller 415) for an aggressor actuator (e.g., VCM 128A) determines a seek operation to be performed. Generally, the seek operation includes radially repositioning a read/write head, or "head," coupled to the aggressor actuator from an initial radial position to a target radial position. In some embodiments, determining the seek operation includes determining a seek length of the seek operation, based on the initial radial position and the target radial position. In some embodiments, the seek operation is included in and/or referenced by a command received by first servo controller 415, such as a read command, a write command, and the like.

In step 802, the control algorithm determines one or more slew rate threshold values (e.g., slew rate threshold value 614 shown in FIG. 6) to be employed in the seek operation. In some embodiments, a single slew rate threshold value is determined for the entire seek operation. In other embodiments, multiple slew rate threshold values are determined for the seek operation. For example, in one such embodiment, a victim actuator performs a more position-sensitive operation in a time interval that corresponds to a second portion of the seek operation. Consequently, in such an embodiment, in step 802 a first slew rate threshold value is selected for a first portion of the seek operation and a second, lower slew rate threshold value is selected for the second portion of the seek operation.

In step 803, the control algorithm determines a set of multiple seek parameters for each slew rate threshold value determined in step 802 for the seek operation. In some embodiments, the set of multiple seek parameters for a particular slew rate threshold value includes one or more parameters that vary depending on the particular slew rate threshold value, such as: a velocity control gain $K_v$; an empirical factor on which a value for $v_{ref,k}$ is determined in Equation 8 (e.g., SlewRamp); and/or a slope of target radial velocities in deceleration profile portion 705A (e.g., slope 742). Additionally or alternatively, in some embodiments, the set of multiple seek parameters for a particular slew rate threshold value includes one or more parameters that vary depending on the seek length of the seek operation, such as: an integer N indicating a duration (e.g., in position samples) of beginning portion 721 (during which $v_{ref,k}$ varies over time) of a coasting phase of the seek operation and/or a duration of end portion 722 (during which $v_{ref,k}$ varies over time) of the constant-velocity phase; a radial position offset (e.g., a number of tracks) from a track associated with initiating coasting portion 520; and/or a radial velocity difference 707 between radial velocity 502 and a deceleration reference trajectory 708.

In step 804, the control algorithm causes the aggressor actuator to perform the seek operation using the seek parameters determined in step 803. As a result, the slew rate threshold value(s) associated with the seek operation are not exceeded, and mechanical disturbances generated by the disturbance events of the seek operation e.g., (disturbance events 651-654) are reduced or eliminated.

In some embodiments, after the aggressor actuator initiates the seek operation, and while a head coupled to the aggressor actuator is radially accelerating, for example during beginning portion 721 of coasting phase 520, the servo controller for the aggressor actuator sets a parameter (e.g., $v_k$) to a first target radial velocity (e.g., $v_{ref,k}$) at a first timing (e.g., time T1 or some other time that corresponds to servo wedge kin beginning portion 721). At a second timing that occurs in beginning portion 721 of coasting phase 520 and is subsequent to the first timing, the servo controller for the aggressor actuator sets the parameter (e.g., $v_k$) to a second target radial velocity (e.g., $v_{ref,k}$), where the second target radial velocity is greater than the first target radial velocity. In such an embodiment, setting the parameter to the first target radial velocity causes the read/write head to accelerate by a first acceleration value, and setting the parameter to the second target radial velocity causes the head to accelerate by a second acceleration value that is less than the first acceleration value. Because the above actions occur during coasting phase 520, in some embodiments, the first acceleration value is less than a constant acceleration value associated with acceleration phase 510 of the seek operation.

Further, in some embodiments, while the head is moving at a constant radial velocity (e.g., at time T3.5 of coasting phase 520), the servo controller for the aggressor actuator sets the parameter to a third target radial velocity that causes the head to decelerate by a first deceleration value. In such embodiments, after setting the parameter to the third target radial velocity, the servo controller for the aggressor actuator sets the parameter to a fourth target radial velocity during end portion 722 of coasting portion 520. In such an embodiment, setting the parameter to the fourth target radial velocity causes the head to decelerate by a second deceleration value that is greater than the first deceleration value. Thus, during end portion 722 of coasting portion 520, deceleration of the head increases, that is, the absolute value of the rate of change of the radial velocity 502 (e.g., slew rate 504) is greater than 0. In some embodiments, such deceleration of the head increases in end portion 722 until a rate of change (i.e., slope 741) of radial velocity 502 in end portion 722 is approximately equal to but no greater than a rate of change (i.e., slope 742) of target radial velocities in deceleration profile portion 705A.

While the foregoing is directed to embodiments of the present invention, other and further embodiments of the invention may be devised without departing from the basic scope thereof, and the scope thereof is determined by the claims that follow.

We claim:

1. A method of performing a seek operation in a split actuator drive, wherein the split actuator drive includes first and second actuators, wherein the first actuator is coupled to a head and is controlled by a first controller in accordance with a parameter for a target radial velocity for the head, the method comprising:
- initiating a seek operation with the first actuator;
- while the head is accelerating, setting the parameter to a first target radial velocity at a first timing and to a second target radial velocity that is greater than the first target radial velocity at a second timing that is after the first timing;
- while the head is moving at a constant radial velocity, setting the parameter to a third target radial velocity that causes the head to decelerate by a first deceleration value; and
- after setting the parameter to the third target radial velocity, setting the parameter to a fourth target radial velocity that causes the head to decelerate by a second deceleration value that is greater than the first deceleration value.

2. The method of claim 1, wherein setting the parameter to the first target radial velocity causes the head to accelerate by a first acceleration value, and setting the parameter to the second target radial velocity causes the head to accelerate by a second acceleration value that is less than the first acceleration value.

3. The method of claim 1, further comprising:
- after setting the parameter to the third target radial velocity, continuing to cause the head to decelerate by greater deceleration values until a deceleration value of the head equals a target deceleration value.

4. The method of claim 1, further comprising:
- detecting the first timing when the head travels over a first servo wedge and the second timing when the head travels over a second servo wedge,
- wherein the first and second servo wedges are adjacent along a movement direction of the head.

5. The method of claim 1, further comprising:
- after initiating the seek operation with the first actuator and before setting the parameter to the first target radial velocity at the first timing, determining that the head has reached a radial position where a coasting phase of the seek operation is to be initiated; and
- upon determining that that the head reached the radial position, initiating the coasting phase of the seek operation.

6. The method of claim 5, wherein the first timing and the second timing are included in a beginning portion of the coasting phase of the seek operation.

7. The method of claim 1, further comprising:
- after initiating the seek operation with the first actuator and before setting the parameter to the first target radial velocity at the first timing, determining that the head has reached a threshold radial velocity where a coasting phase of the seek operation is to be initiated; and
- upon determining that that the head reached the threshold radial velocity, initiating the coasting phase of the seek operation.

8. The method of claim 1, further comprising:
- based on a slew rate threshold value associated with the seek operation, determining an empirical factor; and
- determining the first target radial velocity based at least in part on the empirical factor.

9. The method of claim 8, further comprising determining the slew rate threshold value based on a current or planned operation for the second actuator.

10. A disk drive comprising:
- first and second actuators, wherein the first actuator is coupled to a head; and
- a controller configured to:
- initiate a seek operation with the first actuator;
- control the first actuator in accordance with a parameter for a target radial velocity for the head during the seek operation; and
- while the head is accelerating, setting the parameter to a first target radial velocity at a first timing and to a second target radial velocity that is greater than the first target radial velocity at a second timing that is after the first timing;
- while the head is moving at a constant radial velocity, set the parameter to a third target radial velocity that causes the head to decelerate by a first deceleration value; and
- after setting the parameter to the third target radial velocity, set the parameter to a fourth target radial velocity that causes the head to decelerate by a second deceleration value that is greater than the first deceleration value.

11. The disk drive of claim 10, wherein setting the parameter to the first target radial velocity causes the head to accelerate by a first acceleration value, and setting the parameter to the second target radial velocity causes the head to accelerate by a second acceleration value that is less than the first acceleration value.

12. The disk drive of claim 11, wherein the controller is further configured to, after initiating the seek operation and prior to the first timing, control the head to accelerate by a constant acceleration value that is greater than the first acceleration value.

13. The disk drive of claim 10, wherein the controller is further configured to:
- detect the first timing when the head travels over a first servo wedge and the second timing when the head travels over a second servo wedge,
- wherein the first and second servo wedges are adjacent along a movement direction of the head.

14. The disk drive of claim 10, wherein the controller is further configured to:
- based on a slew rate threshold value associated with the seek operation, determine an empirical factor; and
- determine the first target radial velocity based at least in part on the empirical factor.

* * * * *